Figure 1:
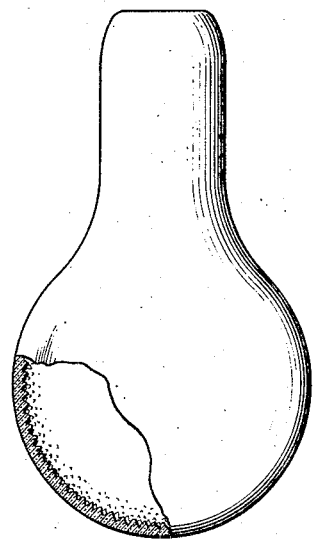

April 5, 1932.  K. FUWA ET AL  1,852,840
METHOD OF STRENGTHENING FROSTED GLASS ARTICLES
Filed Sept. 30, 1927

Inventors:
Kitsuzo Fuwa,
Toshizo Okugawa,
by Charles E. Tullar
Their Attorney

Patented Apr. 5, 1932

1,852,840

UNITED STATES PATENT OFFICE

KITSUZO FUWA AND TOSHIZO OKUGAWA, OF TOKYO, JAPAN, ASSIGNORS TO GENERAL ELECTRIC COMPANY, A CORPORATION OF NEW YORK

METHOD OF STRENGTHENING FROSTED GLASS ARTICLES

Application filed September 30, 1927, Serial No. 223,237, and in Japan December 18, 1926.

The present invention relates to a method of reinforcing or strengthening thin diffusing glassware such as frosted glass articles by giving the frosted glass a heat treatment which does not change the form of the articles.

The principal object of the invention is to reinforce and strengthen the diffusing glassware and frosted glass articles against shocks and also against strains developed by heating. Another object is to provide a simple heat treatment or method for strengthening frosted glass articles made of thin and fragile glass such as incandescent lamp bulbs and similar articles, and particularly hollow thin glass articles frosted on the inside.

When thin blown glass articles such as lamp bulbs are frosted on the inside by the methods generally used for frosting them on the outside the strength is greatly decreased. Measured by bump tests made in the customary way by the present inventors such inside frosted incandescent lamp bulbs are remarkably weak as compared with outside frosted ones, and their strength is as little as 5% of that of similar transparent or unfrosted ones, or but little different from that of an egg-shell and entirely too low for commercial use.

Two methods of frosting blown glass bulbs have been used, the chemical method and the mechanical method. In the former method hydro-fluoric acid or hydro-fluoric acid compounds are applied to the inner surface of the bulb to etch it and produce an appearance of crystallization upon the surface; in the latter method fine grains of sand or emery are blown upon the inner surface to sand blast it, or irregular scratches are produced upon the glass by rubbing it with sand or emery powder. When either method is used the frosted glass observed through a microscope shows a jagged surface consisting of numerous planes irregularly arranged and forming numerous acute angles, and the strength of the glass is greatly lessened so that it breaks easily upon a very slight impact. The jaggedness of the frosted surface is due to a multitude of acute angled projections, much like sawteeth, and of acute angled pits or concavities, which are responsible for cracks upon a slight impact, frequently causing breakage of the diffusing glassware and particularly of the inside frosted bulb.

However, when the entire jagged surface of the frosted glass is changed into a waved surface with the acute angles or jagged parts rounded and somewhat smoothed most of the weakness is eliminated and as a result the strength lost by frosting will be restored to a great extent. United States patent to Pipkin, 1,687,510, October 16, 1928, discloses a chemical reinforcing treatment or method for changing by a medium which has a reinforcing action on the frosted glass the jagged surface of the bulb due to the frosting into a wavy uneven surface by rounding the sharp angles. This method restores much of the strength of the frosted glass until it is practically as suitable as transparent glass for incandescent lamps.

The method of the present invention, however, differs from that above mentioned, and in accordance with the present invention the reinforcing or strength restoring treatment is given by reheating blown glass articles which have been frosted once on the inner surface. Furthermore, by this method of partially fusing the frosted surface to restore the lost strength of the glassware the cracks, if there are any cracks arising from the frosting or from any other cause seem to close and the jagged edges on the frosted glass are partially fused and rounded. According to tests made by the present inventors the strength of a frosted glass article, such as an inside frosted lamp bulb, may be restored by this method to about the same extent as by the Pipkin method. Moreover the present method avoids the use of poisonous chemicals and greatly simplifies the devices used and the manipulation of the bulbs.

In the practice of the invention blown glass bulbs frosted on the inner surface by either the mechanical method or the chemical method are heated on the frosted surface directly or indirectly by such heating means as gas flames, electric furnaces, or any other source of heat. The frosted articles are brought to the heating devices and there treated.

Figure 2:
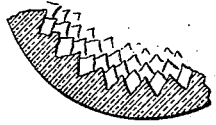
Figure 3:
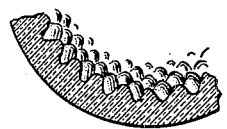

In the accompanying drawings Fig. 1 shows in longitudinal section a blown glass bulb which has been frosted on the inside; Figure 2 is an enlarged view of a portion of said bulb indicating the jagged inner surface produced by frosting; and Fig. 3 is an enlarged view of a portion of an inside frosted bulb which has been treated by our method and the jagged inner surface produced by frosting converted into a wavy surface and the strength practically restored.

The temperature required differs according to time of heating, size and form of articles to be heated, properties of the material, etc., but is preferably limited to such a degree that the form of the bulbs is not changed by the heating process. For example, the bulbs for electric lamps may be heated for a short time to a temperature of 600° C. or even to a temperature above the melting point of the glass if such heating is carefully timed. When such blown glass bulbs are heated to near the melting point the jagged portion of the frosted surface, which is most fusible, melts first as the temperature rises, rounding off the acute angles, and the cracks, if there are any are closed by fusion. If the heating be continued too long the bulb as a whole is softened and distorts due to its own weight and other forces, therefore it is better to stop the heating before such distortion occurs.

The frosted glass bulbs which have their jagged portions rounded off and the cracks, if any, fused shut in this manner recover most of their initial strength without losing the frosted effect. Furthermore, if in operation a tunnel type of furnace equipped with an endless conveyor belt with a continuous motion be used, the speed of the conveyor through said furnace being adjusted to the required heating time for the bulbs and the furnace kept at the desired temperature, the operator need merely handle the bulbs, without doing any water washing or drying as in the chemical treatment.

Another feature of the present invention is that the strength of inside frosted glass bulbs strengthened by the present method is not affected at all by subsequent reheating. The inside frosted glass bulbs with their strength restored by undergoing chemical reinforcing treatments sometimes show a decrease in their strength if further heating be given them, as in making them into electric lamps and similar articles. This loss of strength seems to be caused by cracks developing on the inner frosted surface during the heating necessary in lamp making operations, or the cracks and breaks which arose during the reinforcing treatment may extend. On the contrary if, as in the present method, the inside frosted bulbs be given a reheating treatment at the melting point or above, the cracks and breaks arising in the frosted surface will be fused or closed up, and the inside frosted bulb will develop the property of not being affected by the temperature attained during the ordinary lamp making operations, and there is no lessening of its strength by such operations.

It should be noted that the present method can be applied effectively to inside frosted glass bulbs which have undergone the chemical reinforcing processes and is not limited to those blown glass bulbs which have been inside frosted only once. Furthermore, treatment by the method of the present invention of inside frosted glass articles is not only useful for reinforcing purposes, but also improves the illuminating efficiency of the frosted bulb, therefore, it is particularly effective when applied to bulbs for incandescent lamps or frosted glassware and glass articles used for illuminating purposes.

What we claim as new and desire to secure by Letters Patent of the United States is:—

1. The method of strengthening a bulb for electric incandescent lamps and similar articles which have an etched inner surface which consists in heating said bulb sufficiently to cause a partial fusion of the minute protuberances produced by etching and to change the sharp edged pits comprised in the etched surface to rounded pits.

2. The method of strengthening a bulb for electric incandescent lamps and similar articles which have an etched inner surface of the nature produced by acid etching which consists in subjecting said bulb to heat sufficient to partially fuse the minute protuberances formed by the etching and to change the sharp angled pits formed by said etching into rounded pits.

In witness whereof we have hereunto set our hands this 6th day of September, 1927.

KITSUZO FUWA.
TOSHIZO OKUGAWA.